Dec. 12, 1967     E. H. CARRUTHERS     3,357,155
MACHINE FOR PACKING COMPRESSIBLE MATERIALS INTO CONTAINERS
Original Filed July 23, 1962     5 Sheets-Sheet 1

INVENTOR.
EBEN H. CARRUTHERS
BY
ATTORNEYS

Dec. 12, 1967  E. H. CARRUTHERS  3,357,155
MACHINE FOR PACKING COMPRESSIBLE MATERIALS INTO CONTAINERS
Original Filed July 23, 1962  5 Sheets-Sheet 2

INVENTOR.
EBEN H. CARRUTHERS
BY
ATTORNEYS

INVENTOR.
EBEN H. CARRUTHERS

Dec. 12, 1967 E. H. CARRUTHERS 3,357,155
MACHINE FOR PACKING COMPRESSIBLE MATERIALS INTO CONTAINERS
Original Filed July 23, 1962 5 Sheets-Sheet 4

INVENTOR.
EBEN H. CARRUTHERS
BY
ATTORNEYS

Dec. 12, 1967 E. H. CARRUTHERS 3,357,155
MACHINE FOR PACKING COMPRESSIBLE MATERIALS INTO CONTAINERS
Original Filed July 23, 1962 5 Sheets-Sheet 5

INVENTOR.
EBEN H. CARRUTHERS
BY
ATTORNEYS

United States Patent Office 3,357,155
Patented Dec. 12, 1967

3,357,155
MACHINE FOR PACKING COMPRESSIBLE
MATERIALS INTO CONTAINERS
Eben H. Carruthers, Warrenton, Oreg. 97146
Original application July 23, 1962, Ser. No. 211,727, now Patent No. 3,213,587, dated Oct. 26, 1965. Divided and this application Sept. 17, 1965, Ser. No. 488,142
5 Claims. (Cl. 53—124)

ABSTRACT OF THE DISCLOSURE

The invention of this application is directed to a machine for packing products in cans or other containers, the product being usually a relatively pliable, compressible material such as tuna fish. The machine includes a pair of chambers mounted in vertical alignment with each other, the lower of the two chambers being a metering or measuring chamber and the upper chamber being a chamber in which the product to be filled into the containers is introduced. The machine includes means for applying a substantially constant pressure on the product in the filling chamber to force the product into the metering chamber under a constant pressure so that the capacity of the metering chamber accurately reflects the weight of the product in the metering chamber. The machine further includes means for cutting the product along a plane defined by substantially the top of said metering chamber and means for transferring the product to a can or other container.

This application, which is a division of my copending application Ser. No. 211,727, filed July 23, 1962, now Patent No. 3,213,587, entitled, "Method for Packing Compressible Materials Into Containers," relates to a machine for packing compressible or compactable material, particularly food products, in cans or other containers.

The machine shown and described in this application has been primarily designed for the packing of sauerkraut. However, the broad aspects of the machine of this invention may be applied to the packing of any compressible or compactable product. For example, the principles of the machine of this invention may be applied to the packing of food products of a similar nature to sauerkraut, comminuted meat products, salmon, tuna and other fish products and in fact in any application where it is desired to pack compressible or compactable materials in a can or other container.

In the recent past, much attention has been given by various state legislatures and the Federal Government to force packers of food products to more nearly attain the put-in weight to the labeled weight of the containers. The variation from the labeled weight has, at times, re-resulted in the customer receiving an underweight can, but more often has resulted in a substantial loss to the packer of the food product. The packer has given away free to the customer a substantial margin of product over the labeled weight in order to be certain that in the majority of cans, the product weight is in excess of the labeled weight.

The attainment of the objective of having each can contain a weight of food product at least equaling the labeled weight has raised distinct problems in packing various food products such as sauerkraut, broccoli, salmon, comminuted meat and tuna fish. Most of these products have been heretofore packed by volume rather than weight which creates distinct problems because they are of compressible or compactable materials. The filling of cans with a desired weight of a liquid or semi-liquid material does not present too serious a problem since such products are substantially incompressible. Volume is substantially an accurate reflection of weight.

Much more serious problems arise however, if the material to be packed is of a compressible solid nature as for example, sauerkraut, spinach, comminuted meat products, tuna and other fish products. Such products when delivered to the canning machines will vary in weight depending upon the degree of compaction of the product. Containers of equal volume could be filled completely to the top and yet each container might contain a different weight of product. Weighing of the product prior to placing it in containers is difficult if not impossible in practice because of the necessity of high-speed can filling.

Applicant has devised a machine for precompressing successive portions of the product to substantially the same degree prior to placing such portions in the cans. This precompression is substantially a constant force and is of such nature that the resistance to further compression of the product resists the compressing force so that each successive slug or portion of product to be later placed in a container is compressed to substantially the same density. Thereby equal volumes and equal weight will be placed in each can presented successively to a can filling position. The basic objective of this invention is, therefore, to provide a machine for placing the desired put-in weight in each can of compressible product so that the put-in weight will equal the labeled weight.

Another object of my invention is to provide a can or container filling machine for filling cans with equal weights of a compressible food product and in which the amount of the product placed in each can is substantially the same and the weight placed in each can can be uniformly varied to increase or decrease the weight of product placed in each can.

A further object of the invention is to provide an apparatus for measuring substantially equal weights of a compressible or compactable product wherein a large volume of the product is subjected to compression or compaction by a predetermined pressure and the weight of product to be placed in the can is cut off from said larger volume.

Still another object of the invention is to provide an apparatus wherein a plurality of filling containers of relatively large volume are provided which are in registry with equal volume metering containers or chambers and in which a compactable, homogeneous, substantially solid product is forced from the filling chambers into the metering chambers with a substantially equal pressure so that each chamber or metering container will have an equal weight of the product therein.

My invention further contemplates a machine whereby a filling container and a metering container are brought into alignment with each other and rotated into engagement with a cutoff knife which cuts between the containers, allowance being made for the escape of air from the metering container prior to cutoff and in which the product is compacted to substantially an equal degree in each of successive metering containers.

Other objects and advantages of my invention will be particularly set forth in the claims and will be apparent from the following description, when taken in connection with the accompanying drawings, in which:

Figure 1:
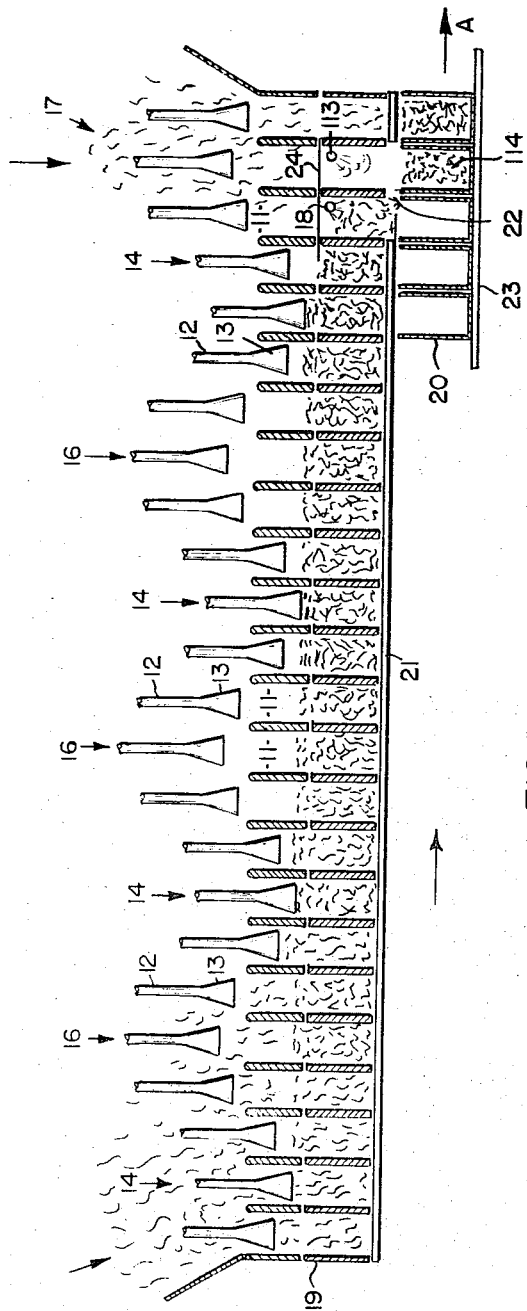
FIG. 1 is a view somewhat diagrammatic showing a developed layout of the machine and showing the complete functional operation as the food product progresses through the machine and is deposited in the cans or other containers.

FIG. 1 which is a developed layout of the machine of this invention, generally illustrates the operation of the machine. In FIG. 1 I have shown a plurality of filling chambers or containers 11. FIG. 1 distorts the capacity of the filling chambers since the volume of material of the filling chambers is substantially larger than indicated in FIG. 1 as will presently appear. Each filling chamber has associated therewith a plunger 12 having a plunger head 13. The plungers are both reciprocated and rotated with respect to and with the filling chambers 11 by a mechanism presently to be described.

When the plunger heads 13 are above the filling chambers or containers 11, the food product is permitted to flow by gravity and by other means presently to be described into the filling chambers. In the machine shown herein which has been specifically designed for the packing of sauerkraut and kindred products, four compression stages generally indicated by the numeral 14 have been provided; three areas generally indicated by the numeral 16 where the product is urged into the filling containers or chambers at least partly by gravity and as urged by suitable tamping means or paddles as will presently be described; and a product ejecting area generally indicated by the numeral 17. In the product ejecting area 17 a blast of air is directed through an orifice 18 and spreads over the top of the compressed product to eject the cake into containers or cans 20 which are moved in the direction indicated by the arrow A. While four areas of compression 14 are shown, this will vary with the product being packed. Two areas of compression or perhaps even one would be sufficient with a dryer product such as comminuted meat or fish products.

The material is compressed into a plurality of metering containers 19 by substantially constant pressure so that each metering container 19 contains substantially the same volume of material compressed to substantially the same degree. Thus, the weight of material in each metering container and therefore placed in each of the cans 20 is substantially a constant. The metering containers 19 are closed at their bottom ends by a dead plate 21 which extends throughout most of the circular extent of the machine except at the point or in the area 22 where the product is ejected from the metering containers or chambers 19 into the cans 20. Further, as will presently appear, the cans flow over a can track 23, more particularly to be later described.

In the packing of sauerkraut and other similar products, the diameter of the plunger head may be substantially less than the diameter of the filling chambers or containers 11. However, in the packing of other products, for example comminuted meat or tuna fish, the diameter of the plunger heads may be such as to snugly fit the inner sidewalls of the filling containers 11. Such an arrangement is shown in my prior Patents 2,567,052 issued September 4, 1951 and 2,602,578 issued July 8, 1952. In the packing of sauerkraut and kindred products there is little tendency for the product to ooze or flow past the lower edge of the plunger to a position above the bottom of the plunger head. However, in comminuted meat and fish products there is a tendency for the product to flow upward or perhaps it should be stated that the plunger moves downward through the product causing the product to lie above the lower edge of the bottom of the plunger heads. In any event the diameters of the plunger head should be such as to obtain the best results with the particular product being packed.

In FIG. 1 the numeral 24 indicates an extremely thin cutoff knife over and under which the filling containers 11 and the metering chambers 19 pass. The relative position of these containers or chambers may be fixed and determined by the thickness of the knife employed. In general, the knife should be as thin as possible which causes a very slight spacing between the lower edges of the filling containers and the upper edges of the metering chambers 19. This space allows air to escape from the product as it is compressed.

One fact which appears to be important will be noted from an examination of FIG. 1. The plunger heads do not enter the metering containers or cylinders 19. The compression occurs from the plunger heads through the material being packed to the material in the metering chambers. Thus, the air can escape around the plunger heads and through the space separating the lower ends of the filling chambers and the upper ends of the metering chambers. Since the pressure, as will presently appear, on the plungers is substantially constant and of a predetermined value, the product in successive metering chambers is compressed to a uniform density.

Figure 3:
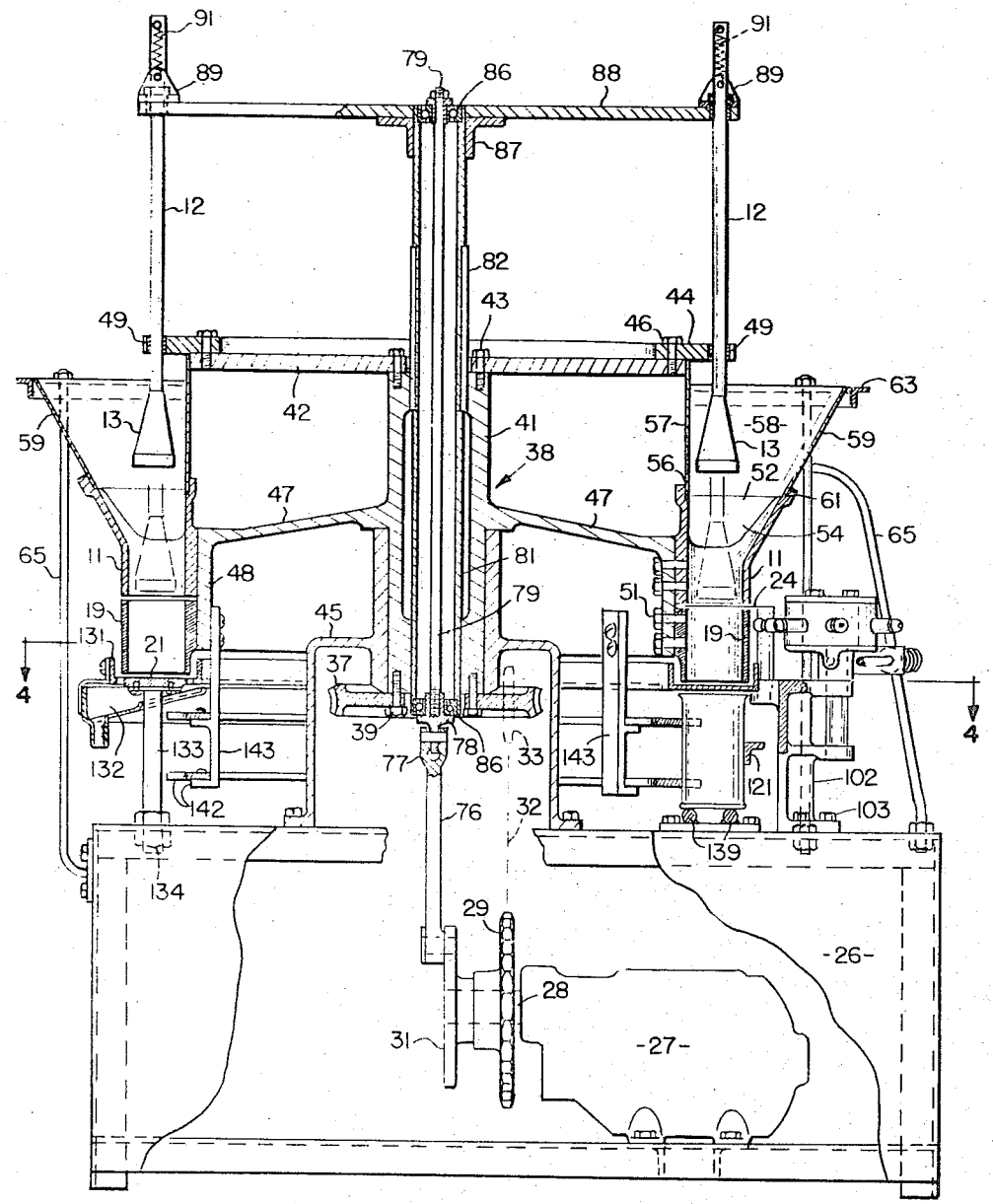
FIG. 3 is a sectional view taken substantially on the line 3—3 of FIG. 2 in the line indicated by the arrows.

Referring now to FIG. 3, the machine of my invention is mounted on a frame, generally indicated by the numeral 26, which is enclosed and has a motor 27 bolted to the bottom wall thereof as shown in the drawings. On the extended motor shaft 28 a sprocket 29 and an eccentric 31 are rigidly mounted.

Figure 4:
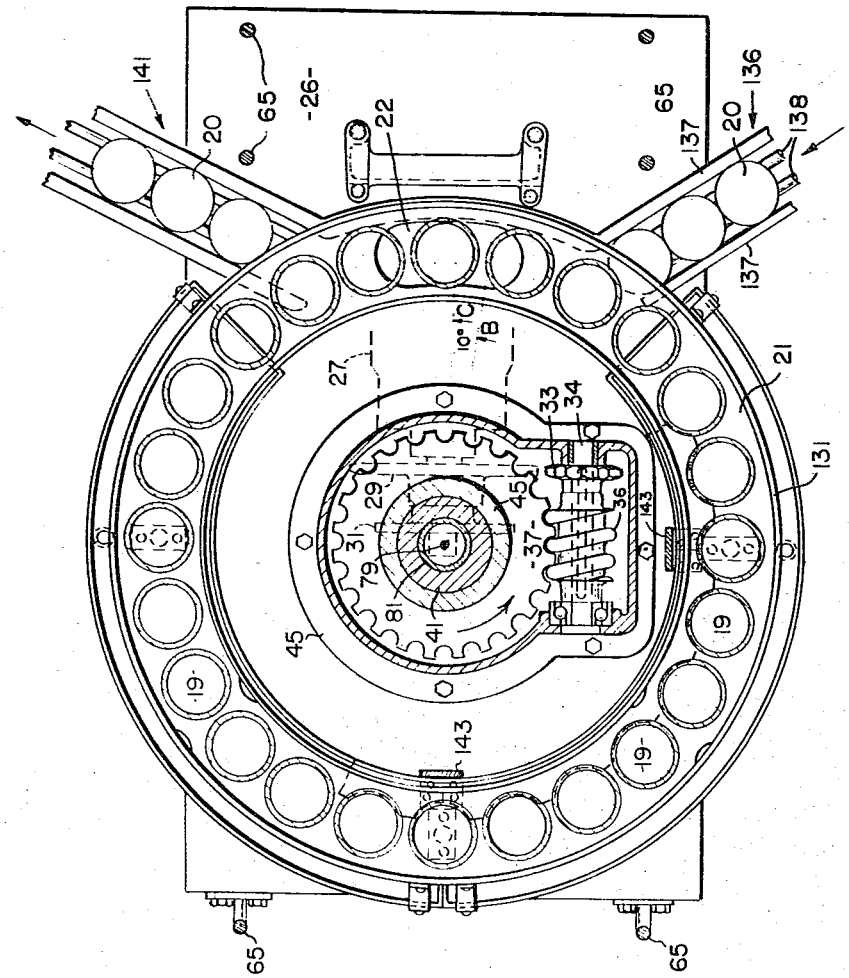
FIG. 4 is a sectional view taken substantially on the line 4—4 of FIG. 3 in the direction indicated by the arrows.

The sprocket 29 through a chain 32 drives a sprocket 33 mounted on a shaft 34 (FIG. 4). The sprocket 33 will not actually show in FIG. 3 but does appear in FIG. 4. Mounted on the shaft 34 adjacent the sprocket 33 is a worm 36 keyed to the shaft (FIG. 4). The worm 36 drives a worm wheel 37 rigidly connected to a turret assembly, generally indicated by the numeral 38, as shown at 39.

The turret assembly 38 comprises a central rotatable column 41, a plate 42 secured, as shown at 43, to the top of the column 41 and an annular plate 44 secured as shown at 46 to the plate 42. These latter two parts could be made in one piece if desired. The annular plate 44 carries a multiplicity of bushing openings 49 for a purpose which will later appear. Extending outwardly from the central supporting column 41 is a plate 47 which could be a spider which carries a depending skirt 48 to which the filling chambers 11 and the metering chambers 19 are bolted as indicated at 51. The turret is carried by a casting 45 bolted to the main frame.

Figure 2:
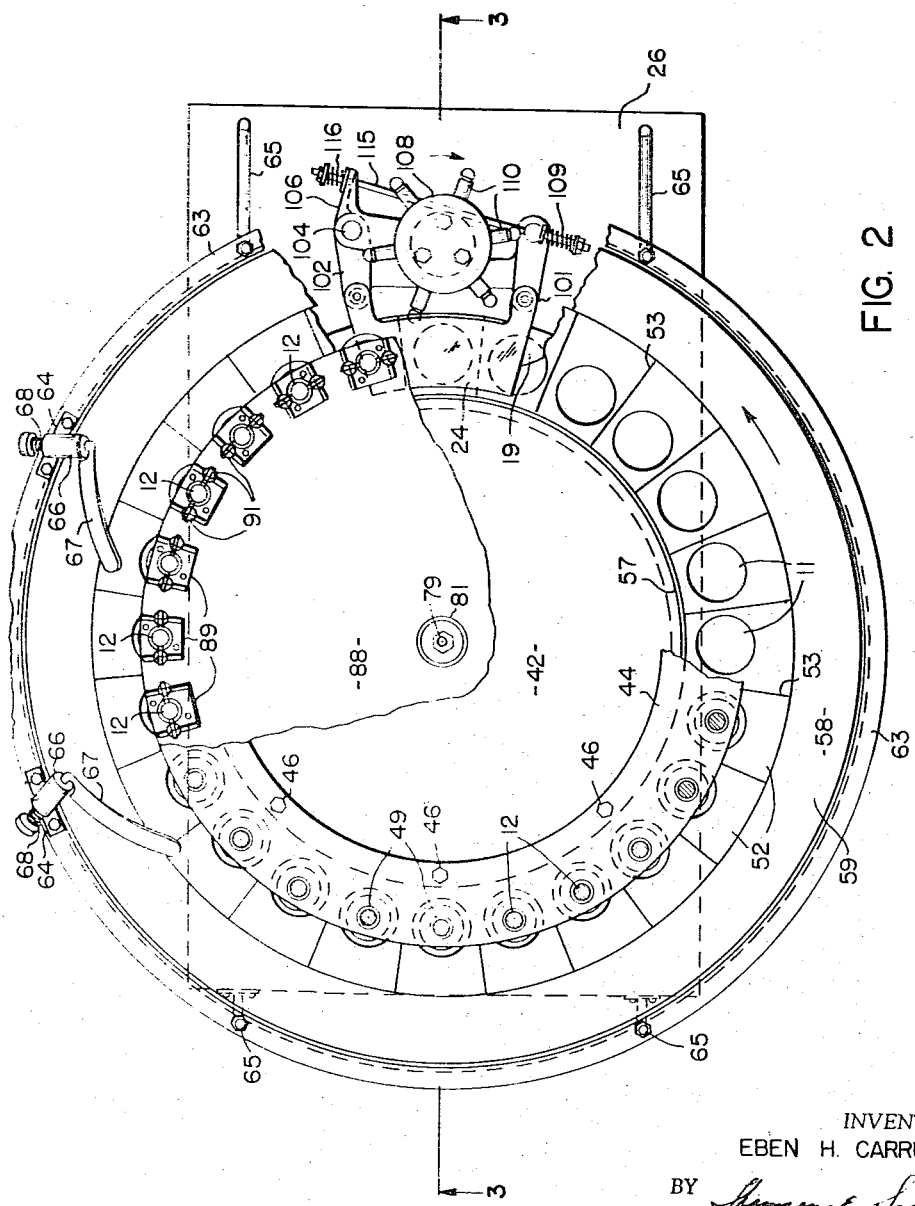
FIG. 2 is a top plan view of the machine with parts broken away to better illustrate the construction.

As will be clear from an examination of FIGS. 2 and 3, the filling chambers 11 have open tops, as shown at 52 and cutoff sidewalls which fit together as shown at 53 (FIG. 6), to provide an annular trough 54 of substantial capacity which opens directly into all of the filling containers or chambers 11. In addition there is fitted to the member 42 and the top edges of the filling chambers 11, as shown at 56, a cylindrical member 57 defining one wall of a reservoir 58. The other wall of the basin or reservoir is a truncated cone 59 supported at 61. A circular ring 63 is supported from the frame of the machine by tie rods 65.

Referring now to FIG. 2, the circular ring 63 has mounted thereon a bracket 64 which carries a cylindrical member 66. A paddle 67 is mounted on a pin extending through the circular member 66 and a torsion spring 68 causes a downward pressure on the paddle as viewed in FIG. 2. Any number of paddles 67 may be employed, only two being shown in the drawing. It will be appreciated that the sauerkraut or other food product is supplied to the reservoir or basin 58 either by hand or by a conveyor and it is desirable that some pressure be exerted on the top surface of the product to assist gravity in pushing the material downward.

Referring now to FIG. 3, the eccentric 31 drives a crank 76 which is connected by means of a universal joint 77 to a fitting 78. The fitting has a boss which is internally threaded to receive a rod 79. A sleeve 81 extends upward concentric with the rod 79 and is keyed, as shown at 82, to the central rotatable column 41. The purpose of the universal joint 77 is to allow the eccentric arm or crank 76 to stay in a fixed plane while the turret rotates.

Figure 7:
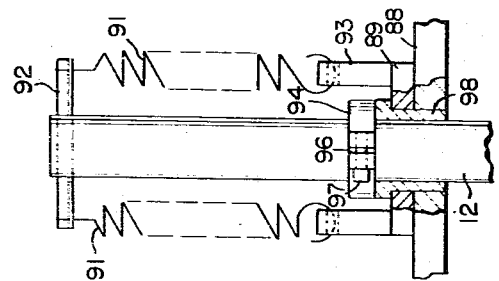
FIG. 7 is an enlarged view of the spring assemblies and showing the method of preloading them.

It will now be appreciated that the crank 76 moves upward and downward to move the rod 79 and the sleeve 81 with a corresponding motion. The rod is supported from the sleeve by upper and lower bearing assemblies 86 so that the rod reciprocates while the sleeve 81 both reciprocates and rotates. Carried by a circular bracket 87 is a plate or spider 88 which carries a plurality of brackets 89 adjacent its periphery. The plate 88 and the bracket 89 are bored to receive plungers 12. A tension spring 91, as shown more fully in FIG. 7, is mounted on each side of each of the plungers. For this purpose the upper end of each plunger has a bore through which a pin 92 passes. Each end of the pin is recessed to receive one end of each of the springs. The bracket 89 has upstanding ears 93 which are bored to receive the other ends of the springs 91. A clamp 94 having a clamping slot 96 embraces the plunger rod and is positioned on the plunger by clamping screw 97. By positioning the clamp along the plunger the pretensioning of the springs may be varied. The collar engages a stop 98. When the plunger head engages the product the collar moves away from the stop. It will be understood that when the plunger heads move downward into engagement with the product, the springs provide a yielding force. In the drawings the springs appear to be relatively short. This is because they have been pretensioned to a substantial degree. This greatly minimizes pressure variations. With other products such as comminuted meat or tuna fish because they are much more compactable than sauerkraut, the springs would be longer and given even greater pretensioning. Since the downward force on the plate 88 is a constant and the pretensioning of the springs 91 is very substantial, a substantially constant force will be exerted on the product in each of successive metering chambers and the volume of the metering chambers is an accurate reflection of weight. While I have shown pretensioned springs and a means of varying the tension, compression springs could be used.

Figure 5:
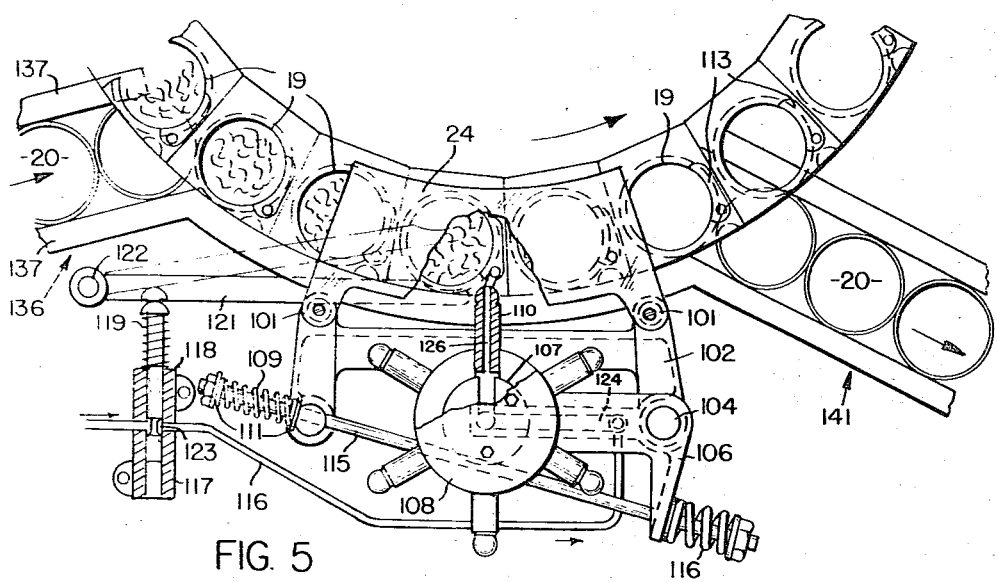
FIG. 5 is a view partly in section showing the cut-off knife, the no-can, no-fill mechanism and the means for supplying air to the slug of packed product in the metering cylinders or chambers for blowing the slug into the containers.
Figure 6:
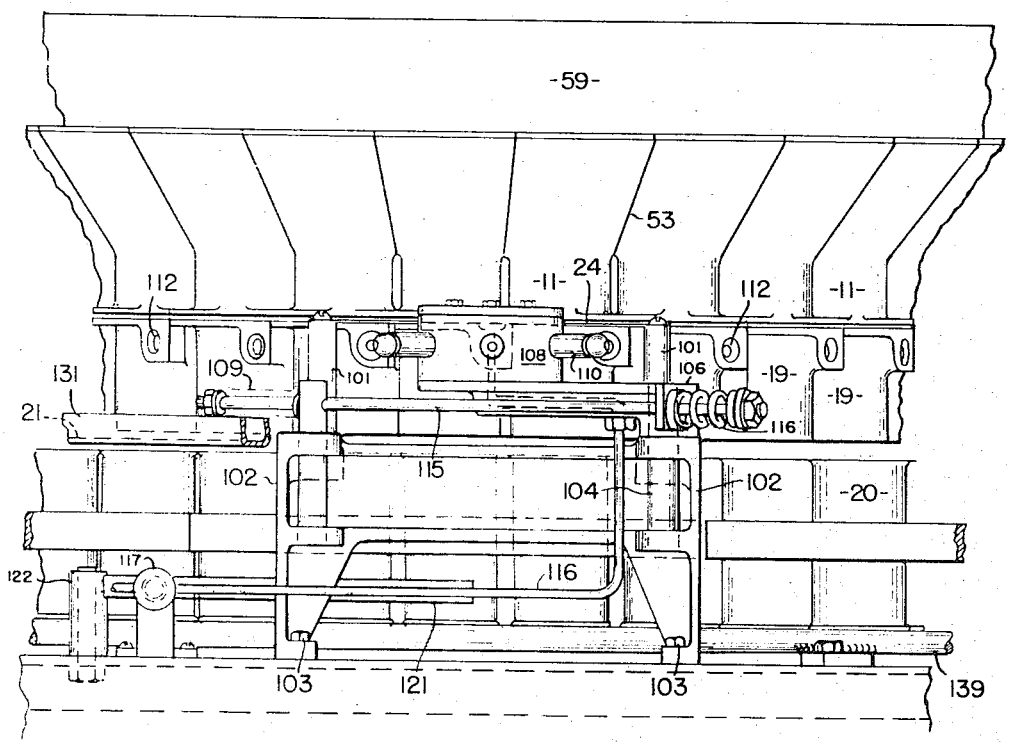
FIG. 6 is a side elevation of FIG. 5.

Referring now to FIG. 5, the knife 24 encompasses approximately three metering chambers or containers 19 and is held fixed by securing it to two vertical rods or posts 101. These rods are fixed to the bracket 102 which is fixed to the frame of the machine as indicated at 103. (FIG. 6). Extending through the bracket 102 is a pivot rod 104 on which is mounted a pivotal bracket or bell crank 106. The pivotal bracket 106 carries a hub 107 on which a six pointed star wheel 108 is mounted having cylindrical ends 110.

A spring 109 having suitable backing elements 111 urges the star wheel, through a rod 115 connected to the pivotal bracket 106, into contact with semi-spherical depressions milled in each metering chamber. These depressions have been indicated in FIG. 6 by the numeral 112. The semi-spherical depressions 112 are connected by the ports 113 (FIG. 1) to cavities 18 formed in the uppermost part of the metering chambers 19 (FIG. 5). The air blast is applied only momentarily during approximately 10° of the arc of movement of the metering chamber. Air is applied at B and terminates at C.

As will be apparent from FIG. 1, air is supplied to the top faces of the product in the metering chamber and, due to the cavities 113, the air spreads over the top of the product and forces the product, as indicated at 114, into the cans 20 as they are successively presented to the filling position. The air blast is confined between the top surface of the product and the lower face of the shear blade or knife 24. It will be apparent that as the spring 109 urges the star wheel into contact with the semi-spherical depressions in each metering chamber the star wheel rotates or automatically "walks" along with the rotating pockets. A second spring 116 presses against the rotatable bracket 106 and renders the bracket pivotal at the other end.

Air or other fluid is supplied through a conduit 116′ from a source of supply and passes through a valve body 117 having a valve plunger 118 mounted therein. Valve plunger 118 is pressed by a spring 119 into engagement with a no-can no-fill arm 121 pivoted on the frame at 122. The arm engages the side surfaces of the cans as shown in the solid line position of the arm 121 in FIG. 5. When no can is present in a position to be filled, the arm moves to the dotted line position and an annular recess 123 in the plunger 118 is moved above the conduit connections 116 so the air supply is cut off. When cans are in the position to be filled the air flows through the conduit 116 to a connection 124 and from thence through a bore 126 in each arm 110 of the star wheel thus supplying air to the top of each of the metering chambers in succession as long as cans are present to be filled.

As shown most clearly in FIG. 3, the dead plate 21 has sidewalls 131 to define a trough. This trough, as shown in FIG. 3, has a drain outlet 132. The dead plate 21 and its associated parts are supported from the frame 26 of the machine by posts 133 secured to the frame as indicated at 134. Sauerkraut is a relatively wet product containing brine. Some of the brine drained from the sauerkraut moves with the metering chambers and falls into the cans. The juice escaping through the drain outlet 132 may be returned to the filled cans of sauerkraut.

What we are interested in, in packing any material into cans is the drained weight. This drained weight having been accurately determined by the machine described, may then be filled substantially to its upper lip with brine. When the machine is designed for the packing of comminuted meat products, tuna or other fish, or in other cases where the product is relatively dry, it would not be desirable to move the metering chambers over a dead plate throughout most of the 360° arc of the machine as shown herein. In connection with comminuted meat or tuna fish, it would be desirable to close the bottom of the metering chambers 19 with plungers, as for example, the plungers 66, 67 of my Patent No. 2,567,052 or the plungers 82 of FIG. 6 of my Patent No. 2,602,578. When plungers are used the cans are deposited from the can chute onto the tops of the plungers as shown in these patents, the plungers being in retracted positions during the placement of empty cans thereon. Thereafter, the air blast would deposit the slug of comminuted meat or fish into the cans.

As shown in FIG. 4, the cans 20 enter the machine by a can chute 136. The can chute may be made up of side rails 137 and bottom rails 138 which merge into bottom rails 139 (FIG. 3) carried by the frame of the machine. The filled can discharge outlet is indicated generally by the numeral 141 and is of a similar construction to the can chute 136. The cans are indexed by can index lugs 142 which have cutouts shaped to the circumference of the cans carried by can index lug brackets 143 (see FIG. 3).

From the foregoing it will be appreciated that the machine of my invention is designed to deposit a predetermined weight of product in each of successive cans so that the drained weight of the product whether it be sauerkraut, comminuted meat or fish will equal the labeled weight on the can. This predetermined weight may be obtained by spring loaded plungers as shown herein or by other means which may be theoretically more accurate in applying a constant pressure on the product being packed. However, by pretensioning the springs and using relatively long springs the variation in spring pressure caused by unequal quantities of product below the plungers will be so slight as to give substantially constant pressure as other factors enter into the problem which in some cases more than overbalance the use of springs as the resilient compacting force. Such factors include the friction between the walls of the cylinder and the plungers which would vary with varying depths of fill or can height, particularly where close fitting plungers are employed as in my above mentioned patents. Thus, for practical purposes, a pretensioned or precompressed relatively long spring can give substantially constant pressure within the limits required for accurate weight control. It will be particularly noted that the plungers do not enter the metering chambers. The compacted product in the metering chambers resists further compaction as the plungers move downward and as modified by the resilient action of the springs.

Figure 8:
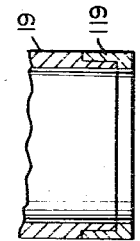
FIG. 8 is a view of the lower ends of the metering chambers to show how the volumetric capacity of the metering chambers may be varied.

In FIG. 8 I have shown a collar 119 fitted to the lower end of the metering chamber 19. By using a longer or shorter collar the volumetric capacity of the metering chamber may be varied. If lower pistons are used as shown in the above mentioned patents, the throw of such pistons can be varied to change capacity by cams such as the cams 97, 98 and 99 of my prior Patent 2,602,578 or the cams shown in my Patent 2,567,052.

While there has been shown and described the preferred form of mechanism of this invention it will be apparent that various modifications and changes may be made therein, particularly in the form and relation of parts, without departing from the spirit of this invention as set forth in the appended claims.

I claim:

1. A machine for packing products in cans comprising, in combination: a pair of chambers mounted in vertical alignment with each other, the lower of said chambers being a metering chamber and the upper of said chambers being a filling chamber; means for applying a substantially constant pressure on the product in said filling chamber to force the product into the metering chamber under a constant pressure so that the size of the metering chamber accurately reflects the weight of product in the metering chamber; means for cutting the product along a plane defined by substantially the top of said metering chamber; and means for transferring the product to a can.

2. A machine in accordance with claim 1 in which the means for transferring the product is an air blast applied on the top surface of the product in the metering chamber.

3. A machine in accordance with claim 1 in which the quantity of product in the metering chamber is less than the quantity above the metering chamber.

4. A machine for packing products in cans comprising the combination of: means for compressing the product in a chamber; means for transferring the product from the chamber to a can comprising a fluid conduit connected to a source of fluid supply; a valve in said fluid conduit; a no-can no fill arm engaging the cans; and means for shutting off the fluid supply when said arm does not engage a can.

5. A machine for packing products in cans comprising in combination: a turret having a central hollow column, means for rotating said turret about a vertical axis; a rod extending through said central hollow column; means for reciprocating said rod; a plurality of metering chambers, a plurality of filling chambers in vertical alignment and in communication with said metering chambers; said chambers being carried by said turret; a plurality of plungers and means including resilient means between said rod and said plungers for applying the force of said plungers on the product in said filling chambers to force the product from the filling chambers into the metering chambers with a substantially constant force.

References Cited

UNITED STATES PATENTS 3,026,660    3/1962    Luthi et al. _____ 53—124

TRAVIS S. McGEHEE, *Primary Examiner.*

R. L. FARRIS, *Assistant Examiner.*